United States Patent [19]

Reichelt

[11] 4,028,657

[45] June 7, 1977

[54] DEPOSITED LAYER TYPE THERMOMETRIC RESISTANCE STRUCTURE

[75] Inventor: Walter G. Reichelt, Hanau, Germany

[73] Assignee: W. C. Heraeus GmbH, Hanau am Main, Germany

[22] Filed: Oct. 22, 1975

[21] Appl. No.: 624,964

[30] Foreign Application Priority Data

Oct. 24, 1974  Germany ................................ 2450551

[52] U.S. Cl. ................................ 338/307; 338/308; 338/309; 338/314; 427/124; 427/125
[51] Int. Cl.² ................................................. H01C 1/012
[58] Field of Search ........................ 338/306–309, 338/314, 28; 427/101–103, 118, 123–126; 428/411, 209, 210, 901; 204/192 C, 192 FR; 73/362 AR; 29/610, 612

[56] References Cited

UNITED STATES PATENTS 2,802,925   8/1957   VonSeelen et al. ................. 338/28
3,845,443  10/1974   Fisher .................................... 338/28

Primary Examiner—C. L. Albritton
Attorney, Agent, or Firm—Flynn & Frishauf

[57]    ABSTRACT

On an aluminum oxide or high-alumina ceramic substrate an intermediate layer of a rare earth, titanium or iron oxide or a mixture of such oxides is provided for matching the thermal expansion coefficient of the substrate to that of a platinum layer between 0.1 and 10 $\mu$m thick applied in a resistor pattern configuration on the surface of the intermediate layer. The intermediate layer, unlike a glass embedding layer, allows heat treatment of the platinum layer by heating the entire structure makes it possible to avoid the embedding to heal local defects, without impairing the integrity of the structure (which occur when glass melt) and without co-crystallizing with aluminum oxide. The platinum layer thickness is consistent with stability of the specific resistance and the temperature coefficient of resistance.

12 Claims, 3 Drawing Figures

DEPOSITED LAYER TYPE THERMOMETRIC RESISTANCE STRUCTURE

This invention relates to a thermometric electrical resistance supported on a carrier substrate of insulating material, particularly aluminum oxide, and having an intermediate layer between the substrate and a platinum layer of a particular configuration suitable for service as a resistance located on the surface of the intermediate layer.

Thin-layer resistances applied by high-vacuum deposition or by cathodic sputtering on an insulating carrier such as glass or ceramic have been known for a long time as thermometric elements by which temperature can be measured electrically.

Although since these devices became known many patents and publications have been directed to the production of thin-layer resistance thermometers, for example Volume 4, part 2 of "Temperature, Its Measurement and Control in Science and Industry," pages 1049 ff. and Volume 33, pages 338–341 of the "Journal of Scientific Instruments," published in September, 1956, resistance thermometers of these types have not become common in industrial practice. The reason for this low level of practical application is apparently the fact that the linear thermal expansion coefficient of such thin layers generally amounts to no more than ⅓ of the corresponding value for pure bulk platinum. For this reason, it was proposed in U.S. Pat. Nos. 3,781,749 and 3,845,443 to embed the electrically conducting material, particularly platinum, in an intermediate glass layer or to enclose it hermetically in a glass phase applied to an aluminum oxide carrier or substrate.

It was found, however, that on account of the excessively low melting point of glasses, it was not possible to carry out the necessary heat treatment of the platinum layer for healing defects in the layer that tend to impair its usefulness. If the temperature is raised above the melting point of the glass, the platinum layer goes to pieces.

It is an object of the present invention to overcome the mismatch in thermal expansion between metal and substrate and also to make the platinum layer so thick that the effect of the free path length of the conduction electrons in the metal, which produces an increase in the specific resistance and a lowering of the temperature coefficient of expansion, can still be neglected.

SUMMARY OF THE INVENTION

Briefly, the platinum layer is made with a thickness in the range from 0.1 to 10 $\mu$m and the intermediate layer is made with a thickness in the same range and of an oxide material consisting of one or more oxides of rare earth elements, titanium or iron or a mixture of two or more of the foregoing oxides. Intermediate layers of such oxide materials have been found to adhere well to an aluminum oxide carrier or substrate without combining into crystals with aluminum oxide which would destroy the desired thermal expansion coefficient of the intermediate layer and thus to be able to match the thermal expansion coefficient of the platinum substrate that of the layer.

Surprisingly, it has been found that the intermediate layer according to the present invention is not only capable of matching the thermal expansion coefficient of the platinum to that of the carrier, but is also capable of meeting the other requirements above noted, especially absence of melting at a defect-healing temperature and avoidance of forming combination crystals with aluminum oxides. Furthermore, the thickness of the platinum layer that provides the electrical resistance element is so selected in accordance with the invention that there is still only a negligible effect of the free path length of the conduction electrons therein that, if not negligible, would result in an increase of the specific resistance and a lowering of the temperature coefficient of resistance. The platinum layer is pure and free of local defects after heat treatment as described later on.

The invention is further described by way of preferred illustrative example with reference to the accompanying drawings in which.

Figure 1:
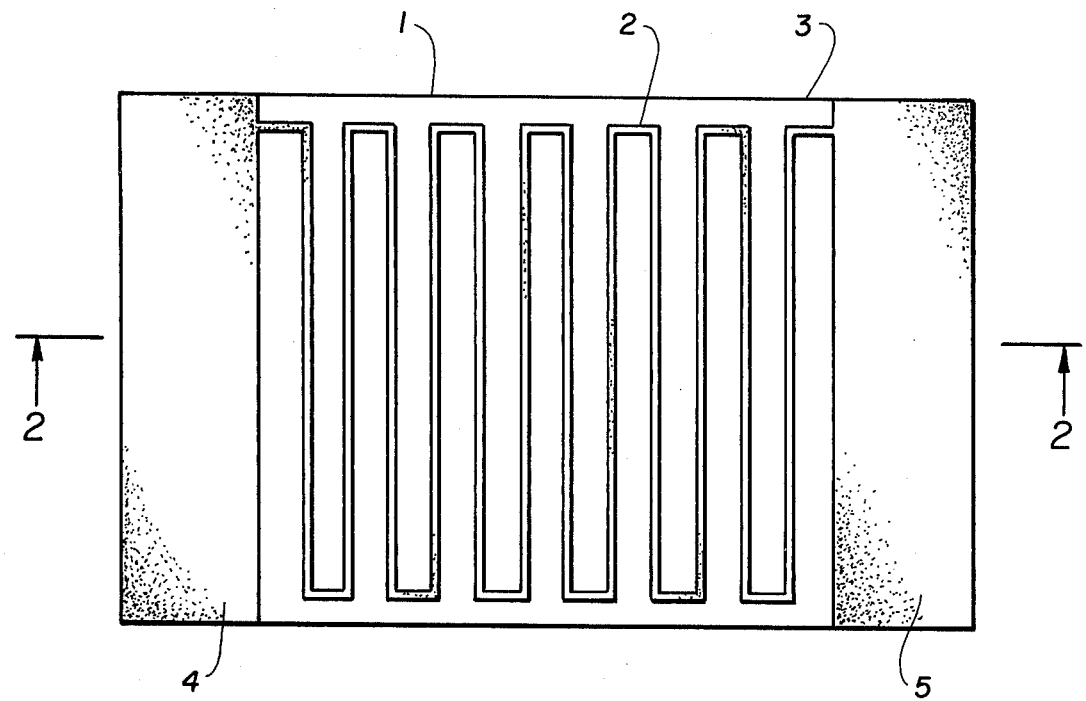
FIG. 1 is a diagrammatic plan view of a thermometric resistance structure.
Figure 2:
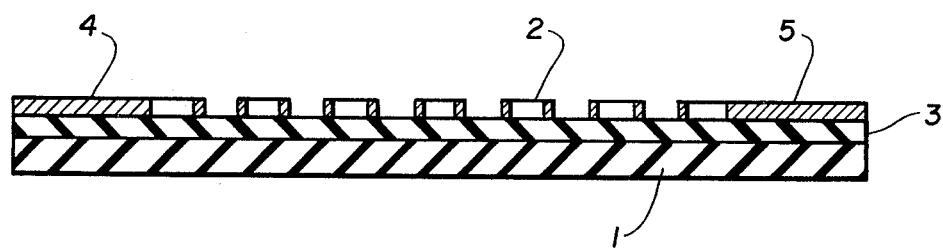
FIG. 2 is a longitudinal section of the resitance structure of FIG. 1.

As shown in the figures of the drawing, the thermometric resistance is composed of a carrier substrate 1, of aluminum oxide ($Al_2O_3$) or a similar ceramic material, for example high-alumina ceramic. On this carrier an intermediate layer 3 is first provided that is in contact with the substrate 1. Then a resistance path of platinum in a meander configuration or some other suitable convoluted pattern is provided on top of the intermediate layer 3. The platinum resistance element is connected at its ends with electrodes 4 and 5 which preferably extend along the entire length of one of the shorter edges of the carrier. The intermediate layer and the resistance path layer 2 are preferably applied by the same kind of process. For this purpose it is particularly useful to use the vapor deposition process and especially by using vaporization by means of electron ray heating, which is effective to vaporize the above-mentioned oxides, as well as to vaporize the platinum in the next step. This process is by far superior from the point of view of introducing the smallest amount of contamination.

The intermediate layer 3 consists of an oxide or mixture of oxides selected from the group consisting of oxides of the rare earth elements, such as lanthanum oxide, yttrium oxide, cerium oxide, for example, and titanium oxide ($TiO_2$) and iron oxide ($Fe_2O_3$). By the use of these metal oxides or metal oxide mixtures the smallest deviation of linear thermal expansion coefficient between electrical resistance layer and carrier substrate is obtained.

It has been found effective in practice to use an intermediate layer of a thickness in the range from 0.1 to 10 $\mu$m, preferably in the range from 0.5 to 5 $\mu$m.

The thickness of the platinum layer applied in a patterned configuration should particularly be in the range from 0.1 to 10 $\mu$m and it is particularly advantageous to have this layer thickness be within the range from 1 to 3 $\mu$m.

A substrate thus provided with intermediate and resistance metal layers is given a heat treatment after the application of all of the layers, including the resistance layer which must be in its final configuration or pattern before heat treatment, by heating in an oven for a period of 1 to 20 hours at a temperature in the region from 1000° to 1400° C. It has been found particularly advantageous to provide the heat treatment for a duration of 3 hours at a temperature of about 1100° C.

Although the invention has been described above by reference to a particular illustrative example, it will be understood that a number of variations can be made without departing from the inventive concept. In particular it is possible to use other processes for metal deposition so long as they fulfill the requirements in purity of the deposited layer or of the patterned configuration laid down. This is particularly true for the resistance layer. For the intermediate layer of the thermometric resistance structure according to the invention the processes of vapor deposition following electron-ray vaporization and of sputtering with a high-frequency electric field are definitely preferred.

Figure 3:
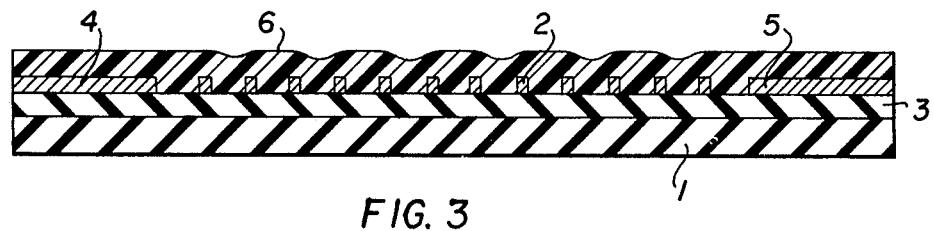
FIG. 3 is a longitudinal section of the resistance structure of FIG. 1 modified by the provision of an outer protective coating.

Of course, as shown in FIG. 3, the thermometric resistance of the above described present invention can also be covered with a supplementary coating surface that is stable over the operating temperature range, for example out of epoxy resin, glass or metal oxides, preferably by vapor deposition, for the purpose of making the structure resistant to chemical attack in special applications, such as those which expose the structure to corrosive media.

I claim:

1. A thermometric electrical resistance structure comprising a carrier substrate consisting chiefly of aluminum oxide, an intermediate layer on said substrate and a patterned platinum layer of a configuration suitable for use as an electrical resistance provided on said intermediate layer, having the improvement that:
   the platinum layer has a thickness in the range from 0.1 to 10 $\mu$m,
   and the intermediate layer has a thickness in the range from 0.1 to 10 $\mu$m and is composed of an oxide material selected from the group consisting of oxides of rare earth elements, titanium oxide, iron oxide and mixtures of at least two of said oxides, whereby said oxide material, by providing electrical and mechanical stability to the structure in manufacturing heat treatment, improves the quality and reliability of the thermometric structure.

2. A thermometric electrical resistance structure as defined in claim 1 in which said substrate consists essentially of aluminum oxide.

3. A thermometric electrical resistance structure as defined in claim 1 in which said substrate consists essentially of a high-alumina ceramic.

4. A thermometric electrical resistance structure as defined in claim 1 in which said intermediate layer has a thickness in the range from 0.5 to 5 $\mu$m.

5. A thermometric electrical resistance structure as defined in claim 1 in which the thickness of the platinum layer is in the range from 1 to 3 $\mu$m.

6. A thermometric electrical resistance structure as defined in claim 1 in which the platinum layer has the characteristics of a platinum layer subjected to heat treatment at a temperature in the range from 1000° to 1400° C for a period of from one to twenty hours.

7. A thermometric electrical resistance structure as defined in claim 1 in which the platinum layer has the characteristics of a vapor-deposited platinum layer.

8. A thermometric electrical resistance structure as defined in claim 1 in which the platinum layer has the characteristics of a sputtered platinum layer.

9. A thermometric electrical resistance structure as defined in claim 1 in which the platinum layer is covered with a protective coating of synthetic resin.

10. A thermometric electrical resistance structure as defined in claim 9 in which said synthetic resin is epoxy resin.

11. A thermometric electrical resistance structure as defined in claim 1 in which the platinum layer is covered with a protective coating of glass.

12. A thermometric electrical resistance structure as defined in claim 1 in which the platinum layer is covered with a protective metal oxide coating.

* * * * *